Z. A. CLOSE.
MEASURING AND WEIGHING MACHINE.
APPLICATION FILED JULY 19, 1916.
1,259,836.
Patented Mar. 19, 1918.
4 SHEETS—SHEET 4.
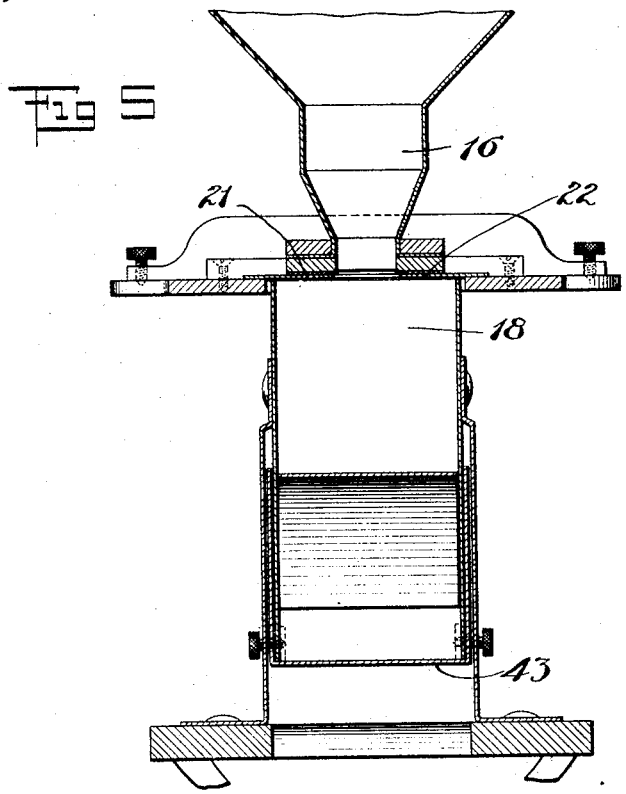
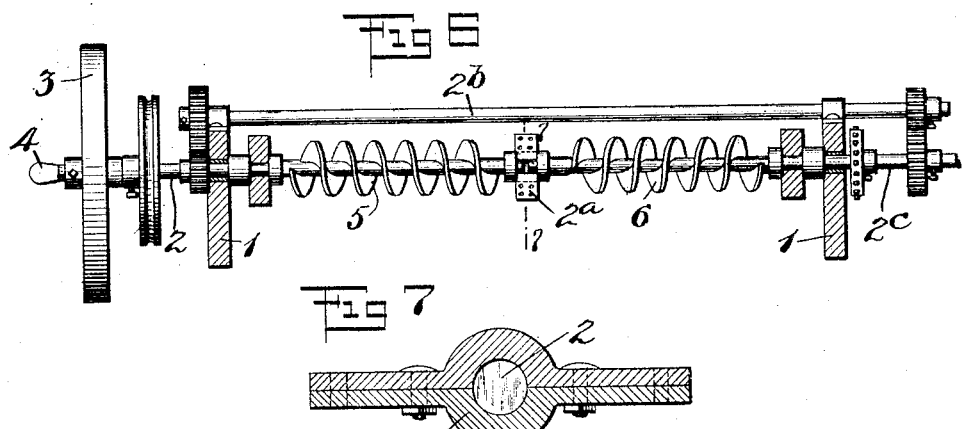
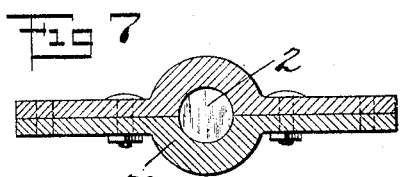

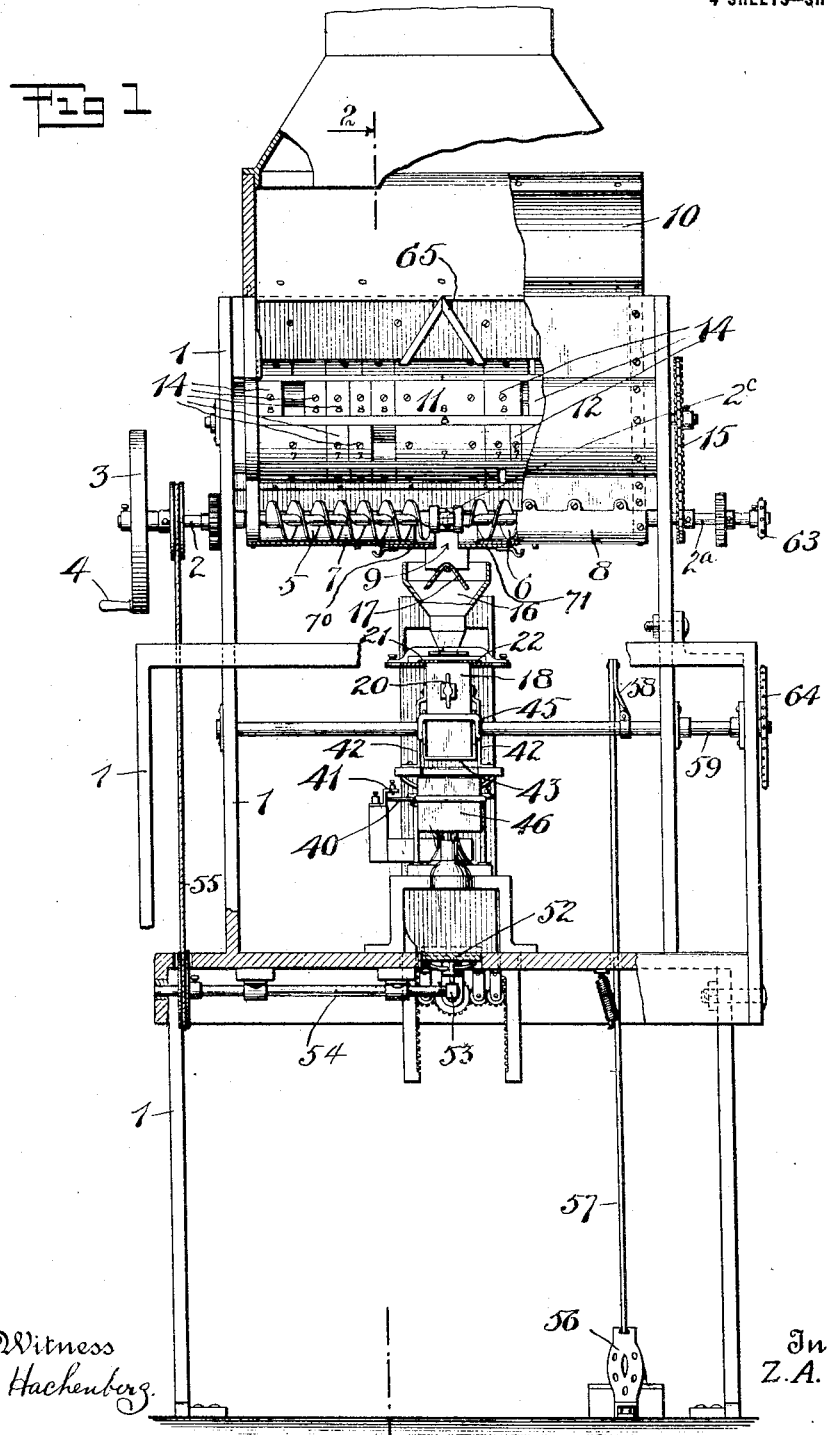

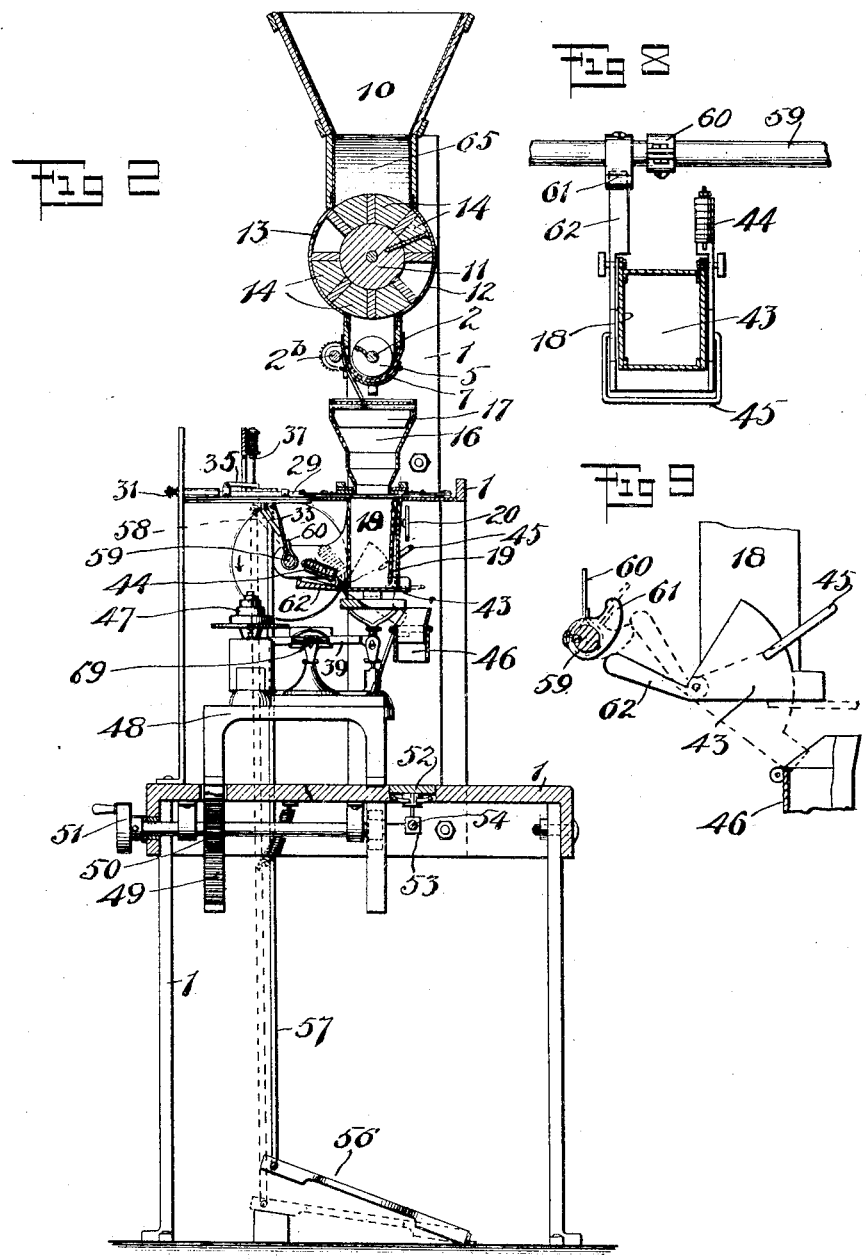

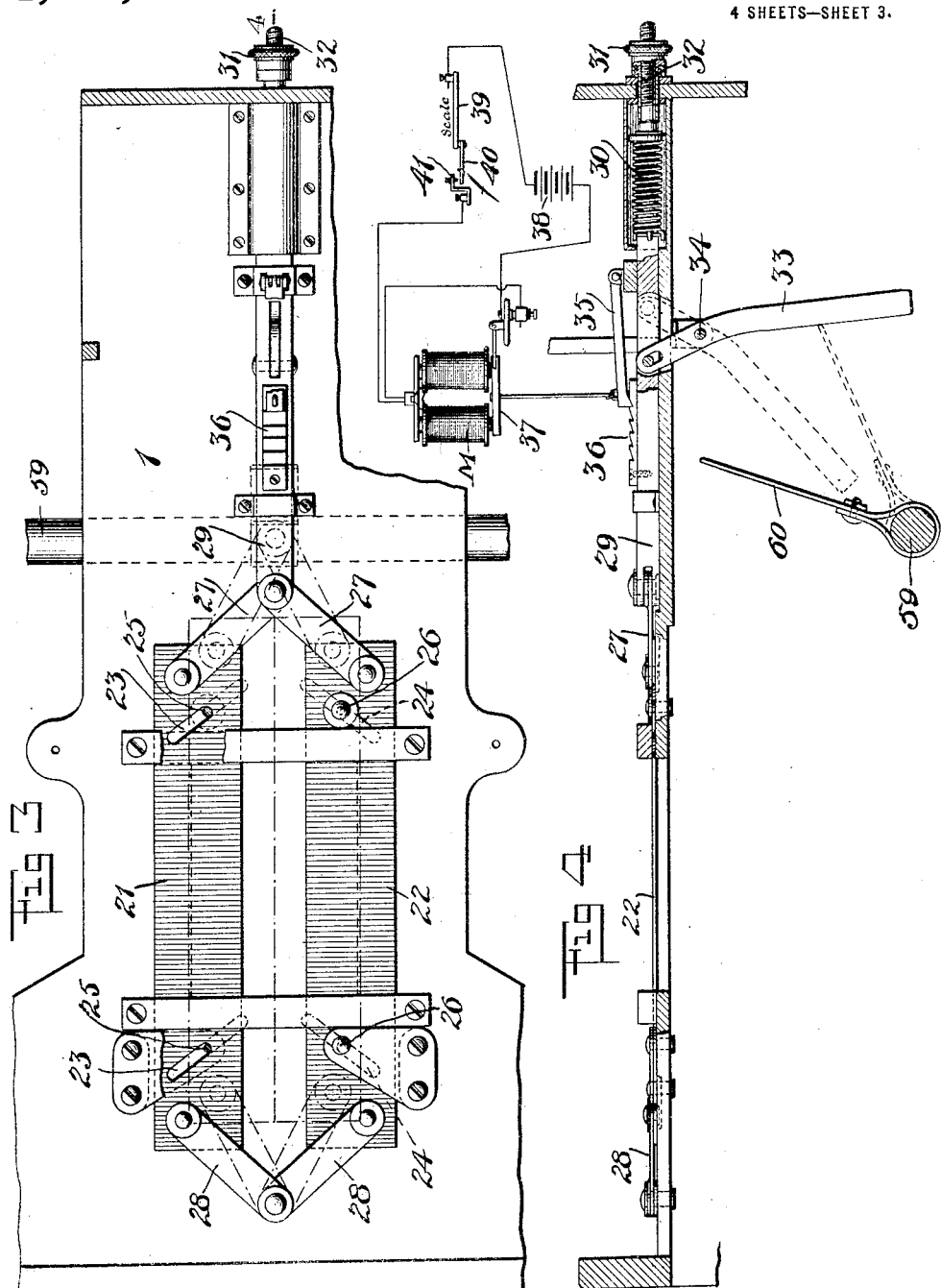

UNITED STATES PATENT OFFICE.

ZACHEUS A. CLOSE, OF MOUNT VERNON, NEW YORK, ASSIGNOR TO RICHARD M. WINFIELD, OF MOUNT VERNON, NEW YORK.

MEASURING AND WEIGHING MACHINE.

1,259,836.  Specification of Letters Patent.  Patented Mar. 19, 1918.

Application filed July 19, 1916. Serial No. 110,045.

*To all whom it may concern:*

Be it known that I, ZACHEUS A. CLOSE, a citizen of the United States of America, residing at Mount Vernon, Westchester county, New York, have invented a new and useful Measuring and Weighing Machine, of which the following is a specification.

My invention relates to machines for measuring and weighing materials, and in that form of the machine which I have selected to show herein, I have illustrated the same as a weighing machine, particularly useful for weighing dry material, such as shot, powder, sugar, tobacco, and other materials, although it is not limited in use thereto.

In the drawings:

Figure 1 is a front elevation of the entire apparatus with certain parts broken away.

Fig. 2 is a cross section on the line 2—2, Fig. 1.

Fig. 3 is a relatively enlarged plan view of certain details of construction.

Fig. 4 is a side elevation thereof.

Fig. 5 is a vertical section of certain details relatively enlarged.

Fig. 6 is a front elevation of certain other details.

Fig. 7 is a cross section on the line 7—7 of Fig. 6.

Fig. 8 is a plan view partly in section of certain details relatively enlarged.

Fig. 9 is a side elevation of the parts shown in Fig. 8.

In the drawings the entire structure is mounted on a suitable standard or framework 1. 2 represents a driving shaft which may be turned from any suitable source of power. 3 represents a pulley on said shaft which may receive a power driving belt, or may have a handle 4 by which the machine may be driven by hand. The drive shaft 2 extends about half way across the machine and is supported at its inner end on a bracket 2ª (see Fig. 6). The drive shaft carries a worm 5. 2ᵇ is a counter-shaft geared to the drive shaft 2 and extending across the frame. 2ᶜ is a shaft corresponding to the drive shaft 2 and arranged in line therewith at the other side of the machine. This shaft 2ᶜ is geared to the counter-shaft 2ᵇ. 6 is a worm on the shaft 2ᶜ. The gearing between the shafts 2 and 2ᶜ is such that one will run at a different speed from the other, that is to say, as shown, the shaft 2 will run at a faster speed than the shaft 2ᶜ all for the purposes hereinafter described. Fitted underneath and around the worms are channeled portions 7—8, respectively, so that any material which drops into the channel portions will be moved by the worms toward the feed outlet. In this instance the feed outlet is indicated at 9, and is approximately midway between the side walls of the main frame or standard. 10 is a hopper of any suitable design mounted on the upper part of the frame. 11 is what I may term a distributing roll by which supply to the feed worms may be controlled either partially or entirely. This distributing roll is located between the hopper 10 and the worms 5—6. 12—13 (Fig. 2) are curved side plates which connect the hopper 10 with the channels 7—8, respectively, which side plates conform to the sides of the roll 11. The roll 11 may have removable blocks 14 provided in any desired number and of varying size. When any of these blocks are removed, they leave corresponding pockets, whereby any material placed in the hopper 10 may enter said pockets and as the roll 11 revolves will be transferred from the upper side of the roll to the lower, or worm-feed, side. By this means, predetermined quantities of the material to be weighed may be delivered from the supply hopper to the feed worms. The roll 11 may be driven in any desired way as by gears or sprockets. In the form shown the drive is effected by means of a sprocket 15 connecting the driving shaft 2ᶜ with the arbor of the roll 11. Directly below the discharge outlet 9 is a funnel 16 which may have mounted therein a suitable deflector 17 to distribute the material. The lower end of the funnel 16 leads down to a chamber 18 in which the material is weighed which preferably is provided with a movable wall 19 (Fig. 2), which may be adjusted by a screw 20 to vary the effective area thereof, for the purpose hereinafter described.

Between the hopper 16 and the measuring chamber 18 is a cut-off, or valve mechanism, preferably constructed as follows: By referring to Figs. 3 and 4, I have shown the cut-off mechanism to comprise two plates 21—22, arranged parallel to each other and movable to and fro. In the construction shown, the plates 21—22 have, respectively, oblique slots 23—23, 24—24. Passing through these slots, respectively, are fixed pins 25—25 and 26—26. 27—27, and 28—28 are two sets of toggle links connected to the opposite ends of the plates 21—22. 29 is an operating rod connected to the joint of one set of toggles. This operating rod has connected to it, a spring 30 mounted in a suitable housing and preferably adjustable in tension, as by an adjusting nut 31 mounted on a screw connection 32. By screwing the nut 31 to and fro, the pulling tension of the spring 30 may be varied. 33 is a lever fulcrumed at 34 and connected at one end to the rod 29 so that the rod may be pushed forwardly in a direction to straighten out the toggles and thereby move the cut-off plates 21—22 apart, as shown in solid lines Fig. 3. In this position the rod 29 is caught and held by means of a trigger 35 which normally operates on a toothed rack 36 on said rod, to hold the latter advanced in said solid line position. M is an electro-magnet, the armature 37 of which is connected to the trigger 35, so that when said magnet is energized, the trigger 35 will be released from the rack, whereupon the spring 30 will pull back on the rod 29 and quickly draw the cut-off plates 21—22 together to cut off the passage from the funnel 16 to the chamber 18. The cut-off position of the plates is indicated in dotted lines, Fig. 3. 38 represents a battery. 39 (Fig. 4) conventionally represents the beam of a scale which carries a movable contact point 40 arranged to close the circuit at 41 when the scale is balanced and thereby energize the magnet M to release the trigger 35. When the load on the scale is insufficient to balance the same, the electric circuit is open and the trigger 35 will, therefore, stand in the rack engaging position.

The measuring chamber 18 is supported wholly by the scales aforesaid, and is steadied on the platform thereof by suitable supports or braces 42—42. The bottom of the measuring chamber is indicated at 43 and is pivoted to the back wall of said chamber. 44 is a suitable counterweight which serves to hold the bottom in the closed position, shown in solid lines, Fig. 2, the weight being sufficient to hold the bottom closed when the measuring chamber is full. 45 represents a handle at the front of the movable bottom by which the bottom 43 may be swung down or opened by hand and to allow the contents of the measuring chamber to flow out. 46 is a chute through which the discharging material may pass into a suitable bag or receptacle placed underneath the outlet of the chute 46. The scale 39 is, of course, so adjusted as to be balanced when the chamber 18 and the associated parts are in place. If it is desired to weigh, say 8 ozs., suitable weights, indicated at 47, would be applied to the back of the scale so that it would require the introduction of 8 ozs. of material into the chamber 18 to balance the scale against the weights and close the circuit to release the trigger 35. Chambers of different sizes may be applied to the scales, if desired, and the scales are preferably mounted on an adjustable platform 48 adjustable in any suitable manner as by a rack and pinion mechanism 49—50 controllable by a hand-wheel 51. 52 is a vibratory platform, upon which the bag or container which is to receive the measured material may repose while being filled. When this platform 52 vibrates it tends to agitate the material fed into the bag and cause it to settle solidly down into the container. The vibratory table 52 may be operated in any desired manner, for example, by means of a cam block 53 on a shaft 54 driven by belt 55 from the driving shaft 2. As the cam block 53 rotates, it strikes against a pin or shoulder on the underside of the table 52 causing it to vibrate for the purpose aforesaid.

The apparatus as to the setting of the valve or cut-off mechanism and the opening of the bottom of the chamber 18, may be either automatically or manually controlled. When manually controlled, it may be operated through a foot treadle 56 which may be connected by a link 57 to an arm 58 which may be clamped upon shaft 59.

This shaft carries an arm 60, which when the shaft is turned swings from the solid line position shown in Fig. 4 to the dotted line position for the purpose of setting the rod 29 and opening the cut off plates 21—22. This shaft 59 also carries a cam 61 which is arranged behind a rearwardly extending arm 62 on the bottom 43 of the chamber 18 (see Fig. 9). When the shaft 59 revolves the cam will automatically open the bottom of said chamber. The arm 60 and cam 61, are, of course, adjusted angularly on the shaft 59 so that they will respectively operate to open the cut-off mechanism and to open the bottom of said chamber at the proper times, respectively, and to that end I provide any suitable form of adjusting means such as the clamping screws shown. When these operations are to be effected automatically, the shaft 59 may be connected by a suitable chain leading over the sprockets 63—64, so that the shaft 59 will be driven from the source of power. At such a time, of course, the arm 58 should be loosened on the shaft 59 so that the shaft may turn freely therein. When it is desired to manually control the opening of the cut-off mechanism, and the chamber 18, the chain for the sprockets 63—64 should be removed, the arm 58 should be tightened on the shaft 59 and the shaft should be so positioned that pressure on the foot treadle 56 will cause the arm 60 and the cam 61 to engage the respective coöperating parts at the proper time and for the aforesaid purpose. 65 is a deflecting partition arranged about midway of the distributing roll which tends to divide the feeding hopper so that the material of one end of the hopper will be fed to one end of the distributing roll, and the material in the other end will be fed to the other end of the distributing roll. Again, when only one end of the distributing roll is used, the material to be weighed would, of course, be placed in only one end of the hopper 10. I desire to emphasize the fact that I have simply shown my weighing machine in one preferred and simple form, and that I apprehend that a wide variety of changes may be made therein without departing from the spirit and scope of this invention.

*In operation:* In setting the apparatus I preferably remove from the left hand end of the distributing roll 11, blocks which provide spaces large enough to receive the major part of the material to be measured in one operation. From the right hand end of the roll, I remove smaller blocks, leaving smaller cavities which are to supply the balance of the material desired for a single roll. The larger openings in the roll are preferably arranged in advance of the smaller openings. The effect of this is as follows: The material to be measured fills the distributing roll pockets which in due course distributes the material first to the worm 5 which has the faster movement and which causes the rapid delivery of the material to the chamber 18 causing the latter to quickly fill up to nearly the desired extent. The last part of the load is delivered more slowly by the slower moving worm 6 so that the effect of gravity will not have any influence on the operation of the scales. The size of the chamber 18 should be such that when the desired load has been filled into said chamber 18 its level will approximately reach the top thereof, that is to say, will reach nearly up to the underside of the cut-off blades 21—22. Hence, when these blades operate to cut-off there will be comparatively no material in suspension in the air below the same which would tend to over-balance the scales and render inaccurate measurement. This, of course, is very material in the weighing of relatively high priced merchandise, such as tobacco, for example, because a comparatively slight variation multiplied many times would represent a very substantial loss which is guarded against and prevented by my improved construction.

The deflector 17 has the effect of interrupting the material in its descent so that it will not enter the chamber 18 too speedily, since with heavy materials this might tend to prematurely over-balance the scale and operate the cut-off. The deflector shown is merely illustrative of any deflecting means that I may desire to employ. In fact, it should be understood that the drawings are merely illustrative of a preferred form of construction, and that many changes and modifications may be made in the various parts shown.

It will be understood that in some cases only one end of the distributing roll may be employed, that is to say, either the fast feeding end or the slow feeding end and that other equally obvious changes may be made. 69 is an adjustable compensating weight on the side of the scales, which is adjustable for slight variations. 70—71 are manually operable slide valves for varying the size of the discharge passage 9.

What I claim is:

1. In a weighing machine, a weighing device, a weighing chamber having an adjustable side member coöperating therewith and having a positively actuated discharge valve at its bottom and a receiving opening at its top, means for conducting material to be weighed into said opening, and an automatic cut-off mechanism comprising a plurality of flat slidable movable members for said opening, with means for controlling said cut-off mechanism by the position of said weighing device.

2. In a weighing machine, a weighing device, a weighing chamber having an adjustable side member coöperating therewith and having a positively actuated discharge valve at its bottom and a receiving opening at its top, means for conducting material to be weighed into said opening, and an automatic cut-off mechanism comprising a plurality of movable members for said opening, with means for controlling said cut-off mechanism by the position of said weighing device, and feeding mechanism comprising two worms simultaneously actuated for feeding the first part of the material to be weighed into the weighing chamber at one speed, and the last part of the material into said chamber at a slower speed.

3. In a weighing machine, a weighing device, a weighing chamber having an adjustable side member coöperating therewith and having a positively actuated discharge valve at its bottom and a receiving opening at its top, means for conducting material to be weighed into said opening, and an automatic cut-off mechanism comprising a plurality of movable members for said opening, with means for controlling said cut-off mechanism by the position of said weighing device, and feeding mechanism for feeding the first part of the material to be weighed into the weighing chamber at one speed, and the last part of the material into said chamber at a slower speed, a distributing and regulating means leading to feeding mechanism, comprising a roll arranged between two partitions and having different sized receiving pockets therein.

4. In a weighing machine, a weighing device, a weighing chamber having an adjustable side member coöperating therewith and having a positively actuated discharge valve at its bottom and a receiving opening at its top, means for conducting material to be weighed into said opening, and an automatic cut-off mechanism comprising a plurality of movable members for said opening, with means for controlling said cut-off mechanism by the position of said weighing device, and a vibratory container support arranged adjacent to the discharge end of said weighing chamber.

5. In a weighing machine, a weighing device, a weighing chamber having an adjustable side member coöperating therewith and having a positively actuated discharge valve at its bottom and a receiving opening at its top, means for conducting material to be weighed into said opening, and an automatic cut-off mechanism comprising a plurality of movable members for said opening, with means for controlling said cut-off mechanism by the position of said weighing device, and means for automatically opening the discharge opening at the bottom of the weighing chamber following the closing of the cut-off mechanism.

6. In a weighing machine, a weighing device, a weighing chamber having an adjustable side member coöperating therewith and having a positively actuated discharge valve at its bottom and a receiving opening at its top, means for conducting material to be weighed into said opening, and an automatic cut-off mechanism comprising a plurality of movable members for said opening, with means for controlling said cut-off mechanism by the position of said weighing device and a worm feed mechanism comprising two worms simultaneously actuated for supplying material gradually to said weighing chamber.

7. In a weighing machine, a weighing device, a weighing chamber having an adjustable side member coöperating therewith and having a positively actuated discharge valve at its bottom and a receiving opening at its top, means for conducting material to be weighed into said opening, and an automatic cut-off mechanism comprising a plurality of movable members for said opening, with means for controlling said cut-off mechanism by the position of said weighing device, said cut-off mechanism including a spring, a rod having a notch therein, a trigger for engaging said notch when said cut-off is open and the spring under tension, and means for releasing said trigger controllable by the operation of the weighing device.

8. In a weighing machine, a weighing device, a weighing chamber having an adjustable side member coöperating therewith and having a positively actuated discharge valve at its bottom and a receiving opening at its top, means for conducting material to be weighed into said opening, and an automatic cut-off mechanism comprising a plurality of movable members for said opening, with means for controlling said cut-off mechanism by the position of said weighing device, said cut-off mechanism including a spring, a rod having a notch therein, a trigger for engaging said notch when said cut-off is open and the spring under tension, and means for releasing said trigger controllable by the operation of the weighing device, whereby said receiving opening is closed by a single relatively quick movement of said rod, and including an electromagnet, a circuit for said magnet, and a circuit closer operable by said weighing device.

9. In a weighing machine, a weighing device, a weighing chamber having an adjustable side member coöperating therewith and having a positively actuated discharge valve at its bottom and a receiving opening at its top, means for conducting material to be weighed into said opening, and an automatic cut-off mechanism comprising a plurality of movable members for said opening, with means for controlling said cut-off mechanism by the position of said weighing device, said weighing chamber having means independent of the bottom for varying the internal capacity thereof.

10. In a weighing machine, a weighing device, a weighing chamber having an adjustable side member coöperating therewith and having a positively actuated discharge valve at its bottom and a receiving opening at its top, a cut-off mechanism comprising a plurality of flat slidable movable members close to the receiving opening with means for operating the same to close said opening when said weighing chamber is filled.

11. In a weighing machine, a weighing device, a weighing chamber having an adjustable side member coöperating therewith and having a positively actuated discharge valve at its bottom and a receiving opening at its top, a cut-off mechanism comprising a plurality of movable members close to the receiving opening with means for operating the same to close said opening when said weighing chamber is filled, said means including a weighing device controllable as to balance by the loaded weighing chamber.

12. In a weighing machine, a weighing device, a weighing chamber having an adjustable side member coöperating therewith and having a positively actuated discharge valve at its bottom and a receiving opening at its top, a cut-off mechanism comprising a plurality of movable members close to the receiving opening with means for operating the same to close said opening when said weighing chamber is filled, said means including a weighing device controllable as to balance by the loaded weighing chamber, and also including a spring connected with said cut-off device to close the same at the desired moment.

13. In a weighing machine, a weighing device, a weighing chamber having an adjustable side member coöperating therewith and having a positively actuated discharge valve at its bottom and a receiving opening at its top, a cut-off mechanism comprising a plurality of movable members close to the receiving opening with means for operating the same to close said opening when said weighing chamber is filled, said means including a weighing device controllable as to balance by the loaded weighing chamber, and also including a spring connected with said cut-off device to close the same at the desired moment, and means for automatically opening said cut-off device after the contents of said measuring chamber has been discharged.

14. In a weighing machine, a weighing device, a weighing chamber having an adjustable side member, means for feeding material to be weighed into said weighing chamber, a positively actuated valved discharge outlet for said weighing chamber, a cut-off comprising a plurality of movable members for said weighing chamber, a weighing device coöperating with said measuring chamber, and means controllable by the position of the weighing device for operating said cut-off to cut-off the feed to said weighing chamber and for operating said valved discharge outlet to permit the material in said chamber to be discharged therefrom.

15. In a weighing machine, a supply receptacle, a feeding device, a rotating distributing and regulating device between said supply receptacle and feeding device, having pockets therein adapted to be arranged for delivering intermittently separate portions of material, a weighing device, a measuring chamber coöperating therewith, and a cut off mechanism therefor.

16. In a weighing machine, a supply receptacle, a feeding device, a distributing and regulating device, comprising a roll partially covered, having pockets therein adapted to be arranged in various relations whereby portions of material of pre-determined bulks are intermittently separated and distributed simultaneously to said feeding device, a weighing device, a measuring chamber coöperating therewith, an electrically controlled automatic cut off mechanism.

17. In combination, a supply receptacle, a distributing and regulating device, comprising a roll partially covered, having pockets therein adapted to be arranged in various relations, a feeding device, means for maintaining material fed to distributing device into a plurality of independent portions, said means including a partition leading to said distributing and regulating device, a weighing device and a chamber coöperating therewith.

18. In combination, a supply receptacle, a distributing and regulating device, comprising a roll partially covered, having pockets therein adapted to be arranged in various relations, a feeding device, means for feeding material to distributing device in a plurality of independent portions, said means including a partition leading to said distributing and regulating device, a weighing device and a measuring chamber coöperating therewith, a cut off mechanism between said distributing roll and measuring chamber.

19. In a weighing machine, a supply receptacle, a feeding device, a distributing and regulating device, rotatably mounted in fixed supports, comprising a roll, partially covered by an adjacent wall portion, having pockets therein and adapted to be arranged in various relations whereby independent portions of material of predetermined bulk are separated and distributed successively to a feeding device, said portions including a major portion of approximately the desired quantity and a smaller supplementary portion, said feeding device comprising members, adapted to deliver the predetermined portions of material successively to a common chamber, a weighing device, a measuring chamber coöperating therewith and an electrically controlled automatic cut off mechanism between said distributing device and measuring chamber.

20. In combination, a supply receptacle, a distributing and regulating device, comprising a roller having independently movable portions to form pockets of different capacity, a feeding device adapted to successively deliver separated portions of material to a chamber, a weighing device, a chamber coöperating therewith and a cut off mechanism near the upper part of said chamber.

21. In a weighing machine, in combination a supply receptacle, a rotating distributing and regulating device having adjustable portions adapted to form receiving pockets to simultaneously separate a plurality of portions of material of different bulk, a feeding device, comprising a plurality of separate members, each to receive a portion of the separated material from said distributing device, a discharge opening for said feeding devices, a weighing device, a chamber supported thereby and cut off mechanism between said feeding device and said chamber.

22. In a weighing machine, in combination, a supply receptacle, a feeding device comprising two movable members adapted to move material in opposite directions to a common discharge opening therein to be successively delivered, a distributing and regulating roll having removable portions therein adapted to form pockets therein whereby portions of material may be separated simultaneously or successively, and delivered to different parts of said feeding device, a weighing device, a chamber carried thereby and a cut off mechanism between said feeding device and said chamber.

23. In a weighing machine, in combination, a supply receptacle, a feeding device, comprising movable members adapted to move material to a chute, a distributing and regulating roll having removable portions therein, adapted to form pockets in various relations whereby intermittently portions of material may be separated successively or simultaneously and delivered to said feeding device, a weighing device, a chamber carried thereby, cut off mechanism and a partition member leading to said distributing and regulating device whereby material may be separated into a number of streams.

24. A distributing and regulating device, comprising a rotating member provided with different sized pockets therein, confining members adjacent said roll, said roll being rotatably supported therebetween.

25. In combination, a distributing and regulating device, comprising a roll, having adjustable pockets therein, adapted to separate portions of material, position members partly surrounding and adjacent to said roll, a weighing chamber, and means to convey material from said distributing and regulating device to said chamber.

26. In combination, a supply receptacle, a distributing and regulating mechanism comprising means arranged to either successively or simultaneously separate a plurality of separate portions of material, and a receiving receptacle, means for guiding said separated portions of material to said receptacle.

27. In combination, a supply receptacle, a feeding means, a distributing and regulating device between said supply receptacle and feeding means, having pockets adapted to be arranged in various relations, whereby separate portions of material may be separated either simultaneously or successively and delivered to different parts of said feeding means, and a receiving receptacle to receive material from said feeding means.

28. In combination, a supply receptacle, a feeding means, a receiving receptacle, a cut-off mechanism between said feeding means and receiving receptacle, and a distributing and regulating device having adjustable means to separate independent portions of material in any desired sequence, said distributing and regulating device being arranged between said supply receptacle and feeding means, whereby said distributing and regulating device acts as a supplementary cut-off mechanism.

29. In combination, a supply receptacle, a feeding means, a receiving receptacle, cut-off mechanism between said feeding means and said receiving receptacle, and a distributing and regulating device arranged between said supply receptacle and feeding means to intermittently separate independent portions of material, whereby said distributing and regulating device acts as a supplementary cut-off member.

ZACHEUS A. CLOSE.

Copies of this patent may be obtained for five cents each, by addressing the "Commissioner of Patents, Washington, D. C."